(12) United States Patent
Lima et al.

(10) Patent No.: US 11,799,954 B2
(45) Date of Patent: Oct. 24, 2023

(54) INTELLIGENT, DECENTRALIZED AND AUTONOMOUS MARKETPLACE FOR DISTRIBUTED COMPUTING AND STORAGE

(71) Applicant: IAGON AS, Hamar (NO)

(72) Inventors: Claudio Lima, Hamar (NO); Navjit Dhaliwal, Hamar (NO); Rohit Gupta, Hamar (NO); Elad Harison, Hamar (NO)

(73) Assignee: IAGON AS, Hamar (NO)

( * ) Notice: Subject to any disclaimer, the term of this patent is extended or adjusted under 35 U.S.C. 154(b) by 0 days.

(21) Appl. No.: 17/291,949

(22) PCT Filed: Nov. 7, 2019

(86) PCT No.: PCT/IB2019/001212
§ 371 (c)(1),
(2) Date: May 6, 2021

(87) PCT Pub. No.: WO2020/099924
PCT Pub. Date: May 22, 2020

(65) Prior Publication Data
US 2022/0006860 A1    Jan. 6, 2022

Related U.S. Application Data

(60) Provisional application No. 62/757,327, filed on Nov. 8, 2018.

(51) Int. Cl.
*G06F 9/50* (2006.01)
*H04L 41/12* (2022.01)
(Continued)

(52) U.S. Cl.
CPC ........ *H04L 67/1074* (2013.01); *G06F 9/5061* (2013.01); *H04L 41/12* (2013.01); *H04L 43/0876* (2013.01); *H04L 67/104* (2013.01)

(58) Field of Classification Search
CPC . H04L 67/1074; H04L 41/12; H04L 43/0876; G06F 9/5061
See application file for complete search history.

(56) References Cited

U.S. PATENT DOCUMENTS 10,447,806 B1 * 10/2019 Sahay .................... H04L 41/12
2009/0164576 A1    6/2009 Noh et al.
(Continued)

OTHER PUBLICATIONS

International Search Report and Written Opinion for International Patent Application No. PCT/IB2019/001212, dated Apr. 21, 2020, 12 pages.

*Primary Examiner* — Tonia L Dollinger
*Assistant Examiner* — Joseph M Cousins
(74) *Attorney, Agent, or Firm* — Jordan IP Law, LLC

(57) ABSTRACT

Method, systems and apparatuses provides for technology that provides a decentralized network. The technology includes a managing node that generates a list of a plurality of compute nodes that are within a tier. The technology further includes a first compute node providing compute resources for other nodes to utilize. The first compute node conducts a determination that the first compute node is within the tier based at least in part on the compute resources, and sends a notification to the managing node to add the first compute node to the list based on the determination. The technology also includes a client node conducting an identification of the tier based on a compute capacity that is predicted to be utilized to execute one or more tasks associated with the client node. The client node identifies the managing node based on the identification and requests the list from the managing node.

19 Claims, 11 Drawing Sheets

(51) Int. Cl.
  *H04L 67/104*    (2022.01)
  *H04L 67/1074*   (2022.01)
  *H04L 43/0876*   (2022.01)

(56) References Cited

U.S. PATENT DOCUMENTS

| | | | |
|---|---|---|---|
| 2014/0006627 A1* | 1/2014 | Arwe | H04L 41/5041 |
| | | | 709/226 |
| 2015/0058261 A1* | 2/2015 | Parikh | H04L 67/1001 |
| | | | 705/412 |
| 2018/0013696 A1* | 1/2018 | Nedeltchev | H04L 43/022 |
| 2018/0145923 A1* | 5/2018 | Chen | G06F 9/5077 |
| 2019/0272331 A1* | 9/2019 | Gangadhar | H04L 41/0897 |
| 2019/0295140 A1* | 9/2019 | Nedeltchev | G06F 16/9558 |
| 2020/0110641 A1* | 4/2020 | Hollinger | G06F 9/505 |
| 2021/0182118 A1* | 6/2021 | Sahin | G06F 9/5094 |

* cited by examiner

Miner Application
Version 1.0.4-beta

Node is ready. ID: QmS7L3kJ9foKNLRuGVKWXTyj8dJdUyobTyj2zhteHnFMg9

◉ Online ⚙

[Add New Task]

T2.large ▼ [Get Available Miners]

| Sr No | Miner ID | Price/hour | Latency(ms) | Country Code | Select Miner |
|---|---|---|---|---|---|
| 1 | QmcrQZ6RJdpYuGvZqD5QEHAv6qX4BrQLJLQPQUrTrzdcgm | 0.005 USD | 120 | BR | [Select] |
| 2 | QmVrri82firc72QfWbTHuxkFLzdR9ZUrwDYkwvcopkiAGp | 0.008 USD | 150 | CV | [Select] |
| 3 | QmcpAHQZVXNN1jqJ2jKVtbrMmo3MRMgXL6JUwwkLtkAt8d | 0.002 USD | 190 | DO | [Select] ← 802 |
| 4 | QmUJaM6jR3pwWBE6y1LKN5iKx3RJGyQFFBDUbf7iDa5N5K | 0.0032 USD | 210 | FO | [Select] |
| 5 | QmSzj8H5eNGtEP4xvPVFh4LkunvWNor8EcUp8f8LYtZTnw | 0.0055 USD | 550 | IN | [Select] |
| 6 | QmPxLfKWT8tcmnkLKCqdEmouEpqM5aF6LJythNSwh1HhxED | 0.0052 USD | 340 | US | [Select] |

🗄 Storage
💲 Processing

Status: Waiting For Encrypted Files.     Uptime: 9 minutes 52 seconds

INTELLIGENT, DECENTRALIZED AND AUTONOMOUS MARKETPLACE FOR DISTRIBUTED COMPUTING AND STORAGE

CROSS-REFERENCE TO RELATED APPLICATIONS

The present application is a US National Phase Patent Application which claims benefit to International Patent Application No. PCT/IB2019/001212 filed on Nov. 7, 2019, which claims the benefit of priority to U.S. Provisional Patent Application No. 62/757,327 filed on Nov. 8, 2018, the entire disclosures of which are incorporated herein in their entireties.

TECHNICAL FIELD

Embodiments generally relate to a decentralized cloud computing marketplace. In detail, some embodiments may be directed towards a marketplace to access compute resources in a decentralized fashion.

BACKGROUND

Some users and enterprises may have fluctuating demands for compute resources. For example, a video streaming service, such as NETFLIX or HULU, may need a higher volume of compute resources after 5 PM when users may not be occupied by job duties. The same video streaming service may have a diminished need for resources prior to 5 PM when people are occupied and unable to use the video streaming service. Such fluctuations in demand may be problematic in that it may not be prudent for the video streaming service to own the resources. Rather, it may be preferential for the video streaming service to rent resources based on fluctuating demand. Likewise, owners of compute resources, like data center operators, desktop or even mobile phone owners, usually have spare compute resources that can be put to use to generate free reward or income for them.

BRIEF DESCRIPTION OF THE DRAWINGS

The various advantages of the embodiments will become apparent to one skilled in the art by reading the following specification and appended claims, and by referencing the following drawings, in which:

FIG. 8 is an example of a graphical user interface according to an embodiment;

DESCRIPTION OF EMBODIMENTS

Figure 1:
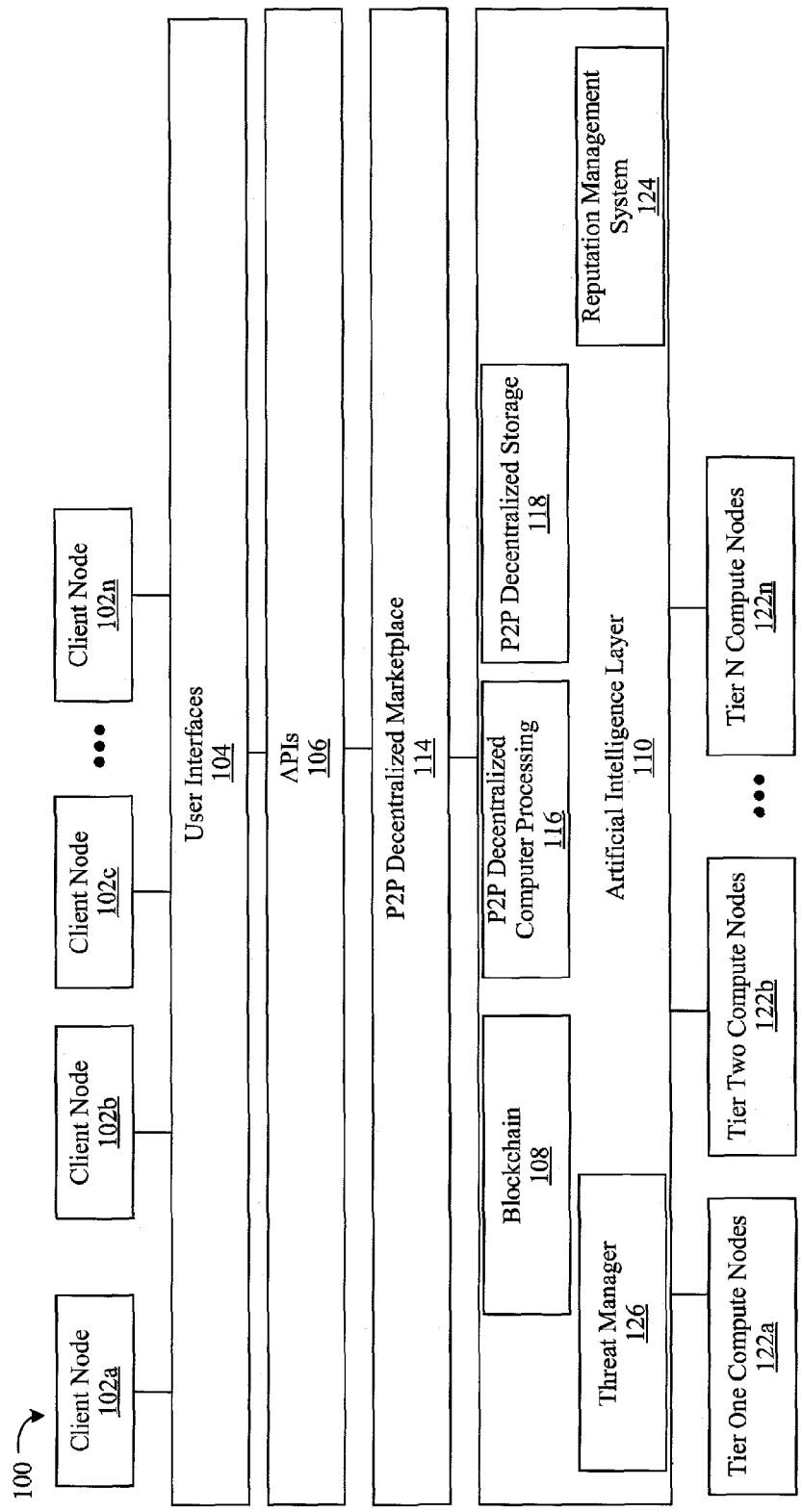
FIG. 1 illustrate an example of an intelligent, decentralized and autonomous architecture according to an embodiment.

FIG. 1 illustrates an architecture 100 for that generates a completely decentralized, intelligent and autonomous marketplace for enabling trading of computing resources like CPU/GPU processing and data storage. Game theoretic micro-economic principles and artificial intelligence (AI) are used for marketplace management, resource allocation, reputation management and overall performance optimization. Some embodiments include Blockchain or distributed ledger technology (DLT) to enable authentication, transaction audit, data security and overall safety guarantees to the marketplace participants.

Clients may be represented by the client nodes $102a$-$102n$. The client nodes $102a$-$102n$ may traverse the network to match with appropriate (e.g., reliable and low cost) distributed computing resources (e.g., computational processing and storage) that may be represented by tier one-tier N miners $122a$-$122n$. That is, the client nodes $102a$-$102n$ may access the network to place an order that is published in a decentralized and autonomous computational marketplace (described below). It will be understood that the number of client nodes $102a$-$102n$ may be different from the number of tier one-tier N miners $122a$-$122n$. That is, the "n" for the client nodes $102n$ may be a different number than the "n" and the "N" in the tier N miner $122n$.

A decentralized marketplace may mean that no centralized component is needed to maintain the overall functioning of the architecture 100. For example, a decentralized architecture may mean that there is no centralized component, or any centralized component may not be critical for the overall functioning of the architecture 100.

Providers of computational resources (sometimes referred to as utilitarians) may be referred to as the tier one-tier N compute nodes $122a$-$122n$. The tier one-tier N compute nodes $122a$-$122n$ may offer computing resources. The tier one-tier N compute nodes may allocate and/or set an amount of resources that the tier one-tier N compute nodes $122a$-$122n$ offer. In some embodiments, the tier one-tier N compute nodes $122a$-$122n$ may allow an artificial intelligence (AI) layer 110 to determine an amount or computational resource, based on token and/or price incentives, usages and other parameters.

In some embodiments, the AI layer 110 may provide an online calculator to the tier one-N compute nodes $122a$-$122n$ to enter in their electricity rates for KwH (kilo-watts per hour) and the AI layer 110 may calculate the expected electricity cost. The AI layer 110 assume that statistically tier one-N compute nodes $122a$-$122n$ may need to be available one-third of the time before client nodes $102a$-$102n$ notice that they are unavailable.

For storage, the AI layer 110 may also ask miners to enter in the date of purchase of their storage (e.g., hard disk) and then the AI layer 110 may amortize the cost per GB by taking into account the typical retail cost for the storage. The electricity cost together with the storage cost may form the actual cost for the tier one-N compute nodes $122a$-$122n$ that may be used during bidding in an auction. A similar process may occur with other hardware components (e.g., of the processor) to estimate pricing.

These resources may be published in the P2P decentralized marketplace 114, several of which can be created dynamically for different kinds of resources and for fault-tolerance purposes. When there is a match between the resources being sought by the client nodes 102a-102n with the resources being offered by the tier one-tier N compute nodes 122a-122n, a smart contract transaction may be consummated using Blockchain and/or DLT technologies. In some embodiments, the contract logic automates the consummation of the transaction.

Several tiers of service (e.g., N tiers of services) may be offered by the tier one-tier N compute nodes 122a-122n. Likewise, the client nodes 102a-102n may desire certain tiers of service. The tiers may specify the levels of computing and storage performance with different levels of uptime, availability and/or trustability.

For example, tier one may be for high performance distributed computing. Tier two may be for small enterprises, medium enterprises and consumer grade computing. Tier three may be for mobile device computing, and so forth. Although three tiers are described above, the number of tiers offered are not limited, as more or less than three tiers may be offered.

The underlying mechanism to enable marketplace creation is based on a peer-to-peer (P2P) network protocol. In this particular example, the Kademila P2P DHT protocol 108 and/or the AI layer 110 may manage all peer nodes discovering, messaging, synchronization and resource allocations.

Further, a reputation management system 124 may rank high performing tier one compute nodes-tier N compute nodes 122a-122n (e.g., computing resource providers), enhance resource allocation and isolate malicious and rogue nodes of the architecture 100. For example, the reputation management system 124 may also build a reputation management service that will conduct machine-learning based predictive analysis and assign a rating (e.g., one to five with one being the worst and five being the best) to every tier one-N compute nodes 122a-122n. The results from this service will be made accessible to all the users maybe through the Blockchain layer, which will help to avoid any additional storage or processing requirement on the tier one-N compute nodes 122a-122n and client nodes 102a-102n as is warranted by the distributed version that is described above.

The reputation management system 124 may provide the ranking to the AI lay 110 to reward high performing tier one compute nodes-tier N compute nodes 122a-122n through financial incentives and/or more jobs. That is, the AI layer 110 may give the high performing tier one compute nodes-tier N compute nodes 122a-122n preferential treatment.

Thus, some embodiments relate to a method and architecture 100 of allocating, authenticating, managing and discovering distributed computing resources (computational power and storage) in peer-to-peer distributed network by using Blockchain and/or DLT to create a transaction-based marketplace that commercializes computing resources with customers looking for high quality and low cost computational power and storage. For example, at least two of the resources include P2P decentralized computer processing 116 and P2P decentralized storage 118.

The AI layer 110 may manage and enhance at least some of the operations to create an autonomous, decentralized, and intelligent cloud computing platform. As illustrated, APIs 106 may facilitate calls between the user interfaces 104 and blockchain 108. The blockchain 108 may serve as a ledger or recordation of transactions, rankings, service requests, resource offerings, reputation scores, etc.

Provided in further detail below are aspects to building an AI driven marketplace for completely decentralizing cloud computing and storage across the tier one compute nodes-tier N compute nodes 122a-122n. In contrast, some other systems may have an overarching centralized component that is necessary and critical for the overall functioning of the system. Embodiments of the present application may relate to distributed computing and storage to build a completely open, decentralized, infinitely scalable cloud computing solution that includes flexible and secure marketplaces for trading compute and storage resources.

The advent of the Blockchain, DLT and cryptocurrency technologies may have enabled Internet scale solutions. Blockchain, DLT and/or P2P networks may be leveraged to building truly decentralized Internet scale cloud computing and storage solutions with expanded resources. In some embodiments, any job that may be encapsulated as a container (e.g., an application with all of its parts may need to include libraries and other dependencies, a docker container, etc.) may be submitted and client nodes 102a-102n may only have to pay for the duration of the execution of the job. Thus, users may be able to access almost unlimited highly available compute capacity at a reduced cost and higher efficiency.

As illustrated in FIG. 1, the architecture 100 includes client interfaces 104 to client nodes 102a-102n. The client interfaces 104 and/or client nodes 102a-102n may be of various platforms (e.g., WINDOWS, MAC OS and LINUX). The client interfaces 104 may operate on the client nodes 102a-102n or may be remote from the client nodes 102a-102n. The client interfaces 104 and client nodes 102a-102n may be connected to the distributed computing and storing resources network infrastructure through an intelligent and P2P decentralized marketplace 114.

The artificial intelligence layer 110, referred to as the "Alexandria Protocol", may enable a distributed computational resource allocation and performance optimization of some embodiments. The artificial intelligence layer 110 continuously learns from the interactions in the P2P decentralized marketplace 114 and optimizes the strategy for participants in the P2P decentralized marketplace 114. For example, the artificial intelligence layer 110 may execute the following:

1. Planning and optimizing the distributed P2P resource allocation and performance of the P2P decentralized computer processing 116 and the P2P decentralized storage 118;
2. Building a reputation for nodes in the system, such as client nodes 102a-102n (e.g., utilitarians), tier one-N miners 122a-122n (e.g., clients) and/or managing nodes (discussed below);
3. Predicting the uptime and availability of client nodes 102a-102n;
4. Predicting the approximate completion time of tasks for the tier one-tier N miners 122a-122n based on task specifications;
5. Recommending the best pricing strategy for the client nodes 102a-102n so as to maximize local resource utilization as well as profit potential.

As the architecture 100 scales with more tasks and participants, machine and/or deep learning models of the artificial intelligence layer 110 may learn from the additional data and may become increasingly more efficient and useful from a participant perspective.

In some embodiments, the artificial intelligence layer 110 may include a threat manager 126 that assess threats to the architecture 100. In some embodiments, the threat manager 126 may modify the behavior and/or parameters of the artificial intelligence layer 110 to mitigate such risks. For example, in some embodiments, the threat manager 126 may modify the behavior and/or parameters of the artificial intelligence layer 110 to mitigate such risks, e.g. exclusion of some of the compute nodes 122a-122n that are identified as potentially imposing risks to the architecture 100.

In some embodiments, the artificial intelligence layer 110 may implement a consensus mechanism. As the name implies, the consensus mechanism involves distributing a compute task to multiple compute nodes (e.g., three or another odd number) of the tier one-n compute nodes 122a-122n, and then selecting the result provided by the majority of the tier one-n compute nodes 122a-122n. The tier one-n compute nodes 122a-122n whose results do not match with the selected results do not get any compensation and also get penalized with respect to the reputation score.

Figure 2:
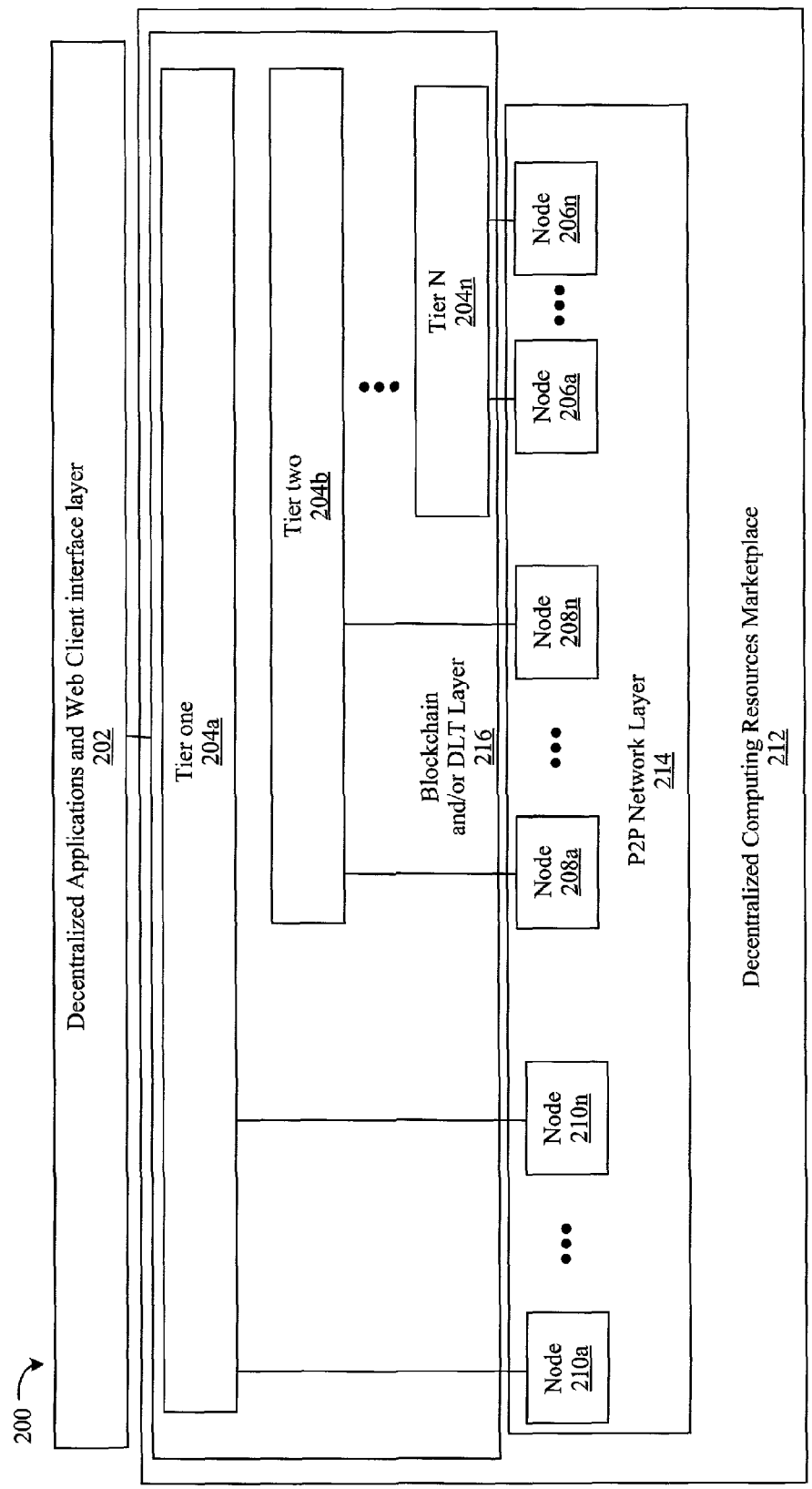
FIG. 2 is an architecture to distribute compute resources according to an embodiment.

Some embodiments relate to building a decentralized distributed computing and storing marketplace. Aspects of the architecture 100, such as the P2P decentralized Blockchain 108 (and/or DLT) and P2P decentralized marketplace 114, tier one-tier N compute nodes 122a-122n, client nodes 102a-102n, and AI layer 110 for distributed computing resources (storage and computation), is shown in more detail in the architecture 200 of FIG. 2. The architecture 200 may be readily implemented as a part of architecture 100 with overlapping components being included within each other.

The architecture 200 may be formed by at least three layers including 1) the Decentralized Applications (Dapps) and Web-client interface layer 202; 2) Blockchain and/or DLT layer 216 (e.g. an Ethereum, IOTA, Corda, EOS, Hyperledger, etc. layer), and 3) P2P network layer 214.

The underlying P2P network layer 214 may include a network protocol where any new nodes can join the P2P network layer 214 and be inserted and synchronized to other peers. Once new nodes are added, the computing resource providers (compute nodes of the new nodes) may then configure the way they want computing resources of the compute nodes to be available in the marketplace and their selected rewards for these services. The services are also added to the Blockchain and/or DLT 216, and are categorized by different tiers one-N 204a-204n of services, where compute nodes of the nodes 206a-206n, 208a-208n, 210a-210n may automatically sign up to publish resources availability using encrypted hash pointers.

Each tier one-N 204a-204n of services publishes a unique set of computing resources within certain parameters (e.g., computing power and storage between certain limits) where clients and computing node providers may interact to commercialize these computing resources in a decentralized manner. Once the service match is identified and a smart contract or any smart code logic transaction takes place in the Blockchain and/or DLT layer 216, tokens may be exchanged between compute and client nodes to pay for the services.

For example, tier one 204a may correspond to enterprise level processing power and storage. Node 210a may be a compute node offering services in the tier one 204a category. That is, the node 210a may provide enterprise level processing power and storage. The node 210a may publish in tier one 204a, the exact level of processing power and storage, pricing requirements, service agreements, time constraints (e.g., must be a job that can execute in under two hours or between 2 AM and 6 AM), etc. of the node 210a. The node 210n may be a client node. The node 210n may require tier one 204a service levels, and therefore receive a list of all published node information in tier one 204a. The node 210n may determine that the publication of the node 210a is acceptable, and select node 210a. The node 210n may execute latency tests prior to selecting the node 210a to mitigate the possibility of high-latency communications. The node 210n may then offload a workload to the node 210a. After the node 210a completes the workload, the node 210n may verify that the workload was satisfactorily executed, and provide tokens to the node 210a if so.

In some embodiments, the node 210n may have an option to select compute nodes from a specific country and/or compute nodes with certain latency characteristics. Multiple P2P networks that are region specific are supported. For example, a P2P network for US West, US East, EU West, EU East, India, South-East Asia, etc. This may not only simplify selecting compute nodes that are geographically close, but also may make it possible to meet region specific data handling requirements like the GDPR regulations in European Union.

Service tiers 204a-204n may be determined as follows. For example, utilitarians in the network may be predominantly home users with laptop and desktop machines. In some examples, these utilitarians may be defined as tier two 204b utilitarians. Enterprise grade hardware, software providers and datacenter operators may also join the architecture 300 to sell compute power and storage. Enterprise utilitarians may be defined as tier one 204a utilitarians. Finally, the tier N 204n utilitarians may be defined as being related to the category of mobile and Internet of Things (IoT) devices, which may have low computing and storing capability but still can offer these resources to the peer-to-peer network of the architecture 200.

The tier two 204b level may be further subdivided into several sub-categories that represent different ranges of computing power as shown below. For example, T2.small may represent any machine with up to two CPUs, between 2 and 4 GB of RAM, and with the CPU speed of up to 2 GHz. The tiering and sub-categorization strategy accounts for future addition of Tier-1 providers. This service tiers one and two 204a, 204b are listed in Table I below. In some embodiments, Table I may include tier N 204n service providers.

TABLE I

Service Tiers Categorization based on Utilitarian Computing Resources

| Tier Level | OS | Up to Number of CPUs | Upto Memory (RAM in GB) | Upto Speed (GHz) | Instance Name |
|---|---|---|---|---|---|
| 2 | WINDOWS/LINUX | 2 | 2 | 2 | T2.nano |
| 2 | WINDOWS/LINUX | 2 | 4 | 2 | T2.small |
| 2 | WINDOWS/LINUX | 2 | 8 | 2 | T2.medium |
| 2 | WINDOWS/LINUX | 2 | 16 | 2 | T2.large |
| 2 | WINDOWS/LINUX | 2 | 32 | 2 | T2.xlarge |
| 2 | WINDOWS/LINUX | 2 | 2 | 4 | T2.nanofast |

TABLE I-continued

Service Tiers Categorization based on Utilitarian Computing Resources

| Tier Level | OS | Up to Number of CPUs | Upto Memory (RAM in GB) | Upto Speed (GHz) | Instance Name |
|---|---|---|---|---|---|
| 2 | WINDOWS/LINUX | 2 | 4 | 4 | T2.small.fast |
| 2 | WINDOWS/LINUX | 2 | 8 | 4 | T2.medium.fast |
| 2 | WINDOWS/LINUX | 2 | 16 | 4 | T2.large.fast |
| 2 | WINDOWS/LINUX | 2 | 32 | 4 | T2.xlarge.fast |
| 1 | WINDOWS/LINUX | More than 2 | | | T1.default |

An agent (e.g., a software agent, application, and/or other piece of software) may determine the number of CPUs and RAM for the compute node and automatically determines the tier that the compute node's resources fall into. The agent may then also look up the managing node for that tier and list the compute node with the managing node for selling the compute resources. The users of the compute node (or the compute node may automatically) have the option to list the time period during which the compute resources should not be used by others. Also, the compute node may provide the price (e.g., USD) for every hour (or other time period) of sharing their compute resources. The client nodes may be charged in increments of N minutes (e.g., 15 mins) intervals for using utilitarian resources. Once a compute node is listed at a marketplace for providing compute services then it may be referred to as a utilitarian.

Figure 3:
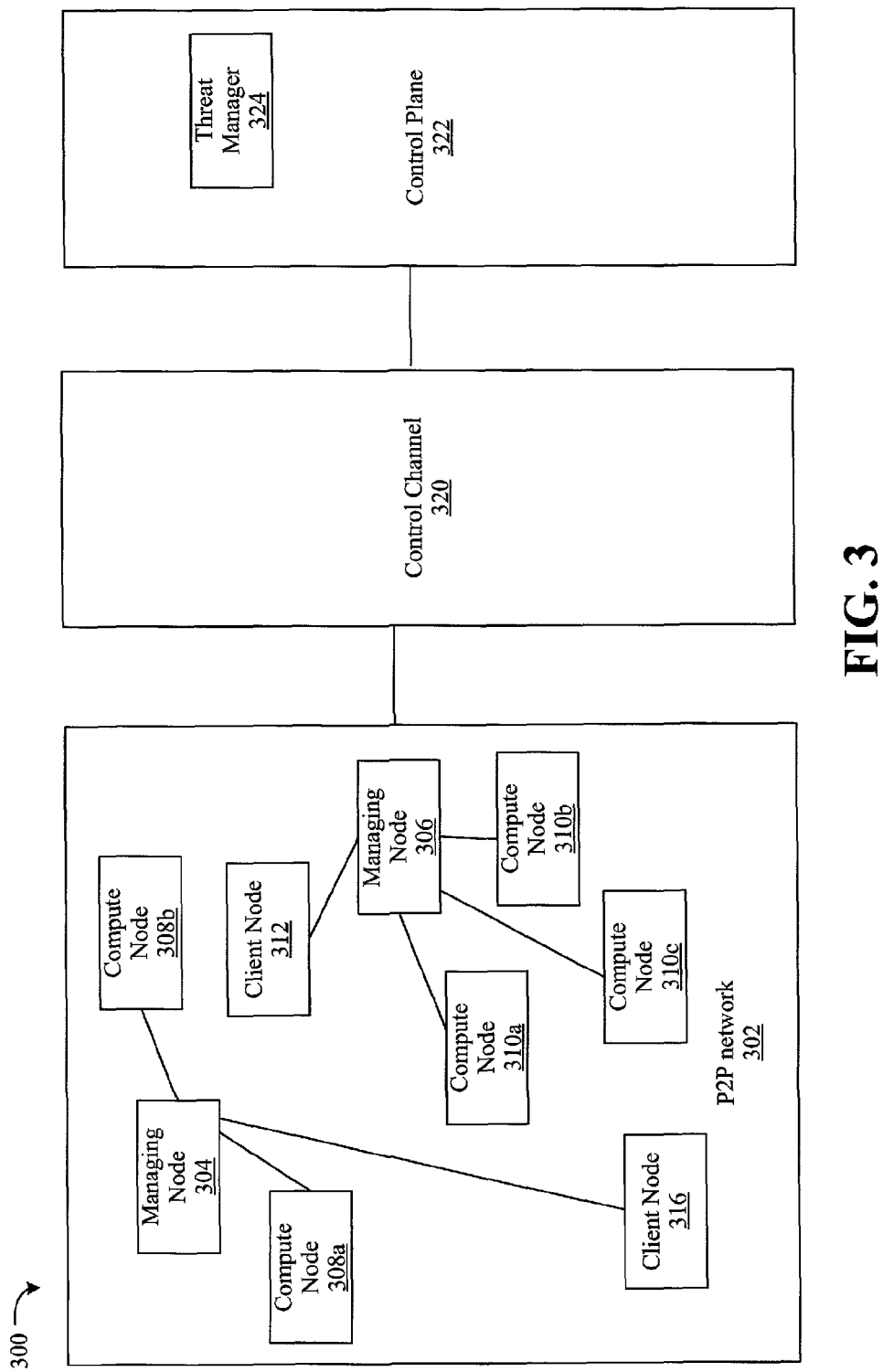
FIG. 3 is a decentralized computing architecture according to an embodiment.

FIG. 3 illustrates a decentralized computing architecture 300 including P2P tiers in the P2P network 302. Aspects of the architecture 100 (FIG. 1) and the architecture 200 (FIG. 2), such as the P2P decentralized Blockchain (and/or DLT) marketplace 114, tier one-tier N compute nodes 122a-122n, client nodes 102a-102n, and AI layer 110 for distributed computing resources (storage and computation), nodes 206a-206n, 208a-208n, 210a-210n, block chain, decentralized computing resources marketplace 212 and decentralized application and web client interface layer 202, are shown in more detail in the architecture 300 of FIG. 3. The architecture 300 may be readily implemented as a part of architectures 100 (FIG. 1) and 200 (FIG. 2) with overlapping components being included within each other.

In the P2P network 302, computing resources may be shared using a Blockchain and/or DLT (e.g. Ethereum, IOTA, Corda, EOS, Hyperledger, etc.) for managing transactions involving compute resources. P2P tiers may be determined based on a computation resources market as described herein.

In some embodiments, elements of the P2P network 302 include:
1. Clients: Client Nodes 312, 316 that are looking for compute resources for executing their tasks and are willing to make payment for those resources;
2. Utilitarian: Compute Nodes 308a, 308b, 310a-310c that want to sell their spare computational resources and store resources for a reward; and
3. Marketplace owners or exchanges: Dynamically selected managing nodes 304, 306 that facilitate discovery of utilitarians by clients. There may be multiple marketplace owners in the network depending upon the range of compute and store resources that utilitarians sell and further to advantageously participate in verification and enforcement schemes.

It is worthwhile to note that the nodes 304, 306, 308a, 308b, 310a-310c, 312 may have more than one mode. For example, any of the nodes 304, 306, 308a, 308b, 310a-310c, 312 may have a dual mode, where it may function as two or more of a client, utilitarian P2P node (e.g., resource provider) and marketplace owner As shown in FIG. 3, for a particular example of a service tier, there may be two marketplaces for compute resources, and that are identified through managing node 304 (e.g., $T2_{nano}$) and managing node 306 (e.g., $T2_{large}$) in the P2P network 302. The compute nodes 310a-310c, 308a, 308b that are selling compute resources may list themselves in one of these two marketplaces via the appropriate managing node 304, 306. For example, the compute nodes 310a-310c, 308a, 308b may broadcast their resource availability through the managing nodes 304, 306.

Similarly, the client nodes 312, 316 that are seeking compute resource lookups identify an appropriate marketplace owner of the managing nodes 306, 304 for a level of service that is desired and obtain a list of utilitarians from the managing nodes 304, 306 who are able to provide that service.

There may be, for example, three sub-categories of computational resources within a particular tier (e.g., Tier 2): 1) nano, 2) medium, and 3) large. "Nano" may mean means small resource (e.g., computer storage and processing) that a utilitarian may offer to the marketplace, "medium" may mean medium resource (e.g., computer storage and processing) that a utilitarian may offer and "large" may mean that large resources (e.g., computer storage and processing) that a utilitarian may offer.

The nodes 304, 306, 308a, 308b, 310a-310c, 312 may have public Blockchain and/or DLT addresses. The nodes 304, 306, 308a, 308b, 310a-310c, 312 may be considered rational entities that participate in order to maximize the value they can generate from the P2P network 302. In some embodiments, game theory principles may apply. On the other hand, there may also be some malicious nodes in the network and a discussion on exemplary ways to minimize their impact on network operations is set forth below.

In some embodiments, the control plane 322 may include a threat manager 324, that may be similar to the threat manager 126, to identify threat model scenarios and solutions. That is, since some embodiments include a completely or substantially decentralized system with no critical centralized governance, there may be various scenarios in which different participants might try to manipulate the architecture 300 for selfish gain. The threat manager 324 may identify such key scenarios and enact technical solutions for ensuring that the overall system continues to function with high performance and fidelity.

For example, in the Eclipse attack, an adversary may eclipse an individual node from participating in a P2P network. Such an attack may be possible if, for example, more than 50% of network nodes are controlled by an adversary. According to an exemplary embodiment, adding IP address along with the a Blockchain (e.g., Ethereum) public address may be used to generate the P2P network id for nodes, such as:

Kad P2P network emlia id=hash(Ethereum public address, IP address, country code)

Thus, the risks associated with an Eclipse attack may be mitigated by assigning IDs as described above.

The Sybil attack may be an extended version of the Eclipse attack where an adversary may be able to control most of the nodes 304, 306, 308a, 308b, 310a-310c, 312, 316 in the P2P network 302 so as to bring down the overall reputation and functioning of the P2P network 302. In fact, this attack is a prerequisite for the Eclipse attack to succeed.

One manifestation of the Sybil attack in architecture 300 is that an attacker may control the marketplace and compute nodes 310a-310c, 308a, 308b (e.g., the utilitarians) and take control of client computations wherein they get paid for the work of the compute nodes 310a-310c, 308a, 308b without doing any actual work. A client node of the client nodes 312, 316 who is relying on a single compute node of the compute nodes 310a-310c, 308a, 308b or a set of compute nodes 310a-310c, 308a, 308b for performing the work for them will have no way to know whether the output received is correct or fake.

The technical solution and mitigation strategy described above for the Eclipse attack may be useful. There are several other techniques that may be employed that will also help for "good" nodes of the managing, compute and client nodes 304, 306, 308a, 308b, 310a-310c, 312, 316 in the P2P network 302 to be able to minimize the impact of a Sybil attack. These techniques revolve around reputation management and cross-checking computation results. Thus, some embodiments may maintain management details and cross-check computation results to protect against Sybil attacks.

In some attacks, it may be possible for greedy utilitarians to submit a low-cost bid for tasks but then provide a poor quality of service for client nodes 312, 316. The client nodes 312, 316 may not know immediately that the greedy utilitarians provided poor quality or incorrect computation on the tasks provided to them. This may be a form of Sybil attack, but on a small scale wherein there are greedy utilitarians who want to get compensation for tasks without actually completing those tasks. The techniques proposed for dealing with the Sybil attack will also be useful for both avoiding these greedy utilitarians from winning the auction process and also from detecting output where greedy utilitarians did not perform the necessary computation.

In some embodiments, malicious marketplace owners (e.g., managing nodes) may be present. In this attack scenario, the impact of having malicious marketplace owners in the P2P network 302 are discussed. In this scenario, the types of attacks that are possible include a) colluding with the malicious compute nodes (e.g., utilitarians) and suppress good nodes from participating in the auction process; and b) not storing and/or not sharing information with the client nodes 312, 316 in an effort to diminish the overall system utility. The following problems may be addressed in the following manner as part of the solution and may be implemented and/or propagated through the threat manager 324:

1) Building a reputation for the marketplace owners similar to the way of building reputation for the compute nodes 308a, 308b, 310a-310c (as described herein);
2) Rotating the marketplace owners for each for a given tier of service. As will be explained, the architecture 300, for computing the hash of a tier one of the input values uses the week number of the year. So, every week the compute nodes 308a, 308b, 310a-310c, even for the same tier, re-list themselves with a new managing node that may be selected from the P2P network 302. The client nodes 312, 316 may be able to find the new managing nodes since they also keep updating the hash they use to do a lookup for them. It should be noted in some embodiments, that at all times in the instant architecture 300 may be based on Coordinated Universal Time (UTC). Thus, it may not be required to globally synchronize clocks across the P2P network 302. If a client node of the client nodes 312, 316 does a lookup for a managing node from the managing nodes 304, 306 for a tier and no compute node information is received, the architecture 300 may automatically retry for a new managing node by bumping up the week number by 1. That is, in order to ensure resiliency, some embodiments may also support having multiple network nodes working as co-owners of a marketplace, either in active-active mode or active-passive mode. Nodes which agree to serve as marketplace owners form a peer-to-peer network using a protocol like Chord or Kademlia, and the exact marketplace owner of a compute resource value is determined by generating a hash and doing a lookup for that hash value.
3) There may be redundant marketplace owners (managing nodes) for every tier. The redundant managing nodes may be the immediate successor neighbors of the designated managing node. So, for example, say the managing node 306 is the marketplace owner for Tier-1, then the compute nodes 310a-310c may also list themselves in the immediate successor which is Node 2. The client node 310 when getting the list of compute nodes 310a-310c from managing node 306 may also contact Node 2 and get the list of compute nodes 310a-310c. If the two sets of data vary significantly even after contacting the compute nodes 310a-310c then the client node 312 may omit payment to managing node 306 and also broadcast a poor reputation for the managing node 306.

In some embodiments, free-loading client may attach the architecture 300. That is, it is possible that client nodes 312, 316 may also misuse the resources in the P2P network 302 by getting their tasks executed by compute nodes 308a, 308b, 310a-310c, but not marking the payments to the compute nodes 308a, 308b, 310a-310c and managing nodes 304, 306. This is solved by using Blockchain and/or DLT as an escrow and enforcing the transaction through a smart contract.

In some embodiments, one of the results verification technique that is employed is to make sure that compute nodes are not returning "junk results" back to client nodes (e.g., a Trojan injection). To mitigate this, some embodiments may include automatically injecting a step in a client computation that has a known output value and verifiable value. When a task is completed, the output results from the compute node should have this known value included in the output results. Docker tasks related to web hosting may accept a "healthcheck URL" as well that is able to be continuously checked against to make sure that the compute node is hosting the web site (or web service) that the compute node is expected to host. If the known value is missing, then the architecture 300 may determine that a compute node has not processed the task as per the client node's specification and therefore should not be paid.

Figure 4:
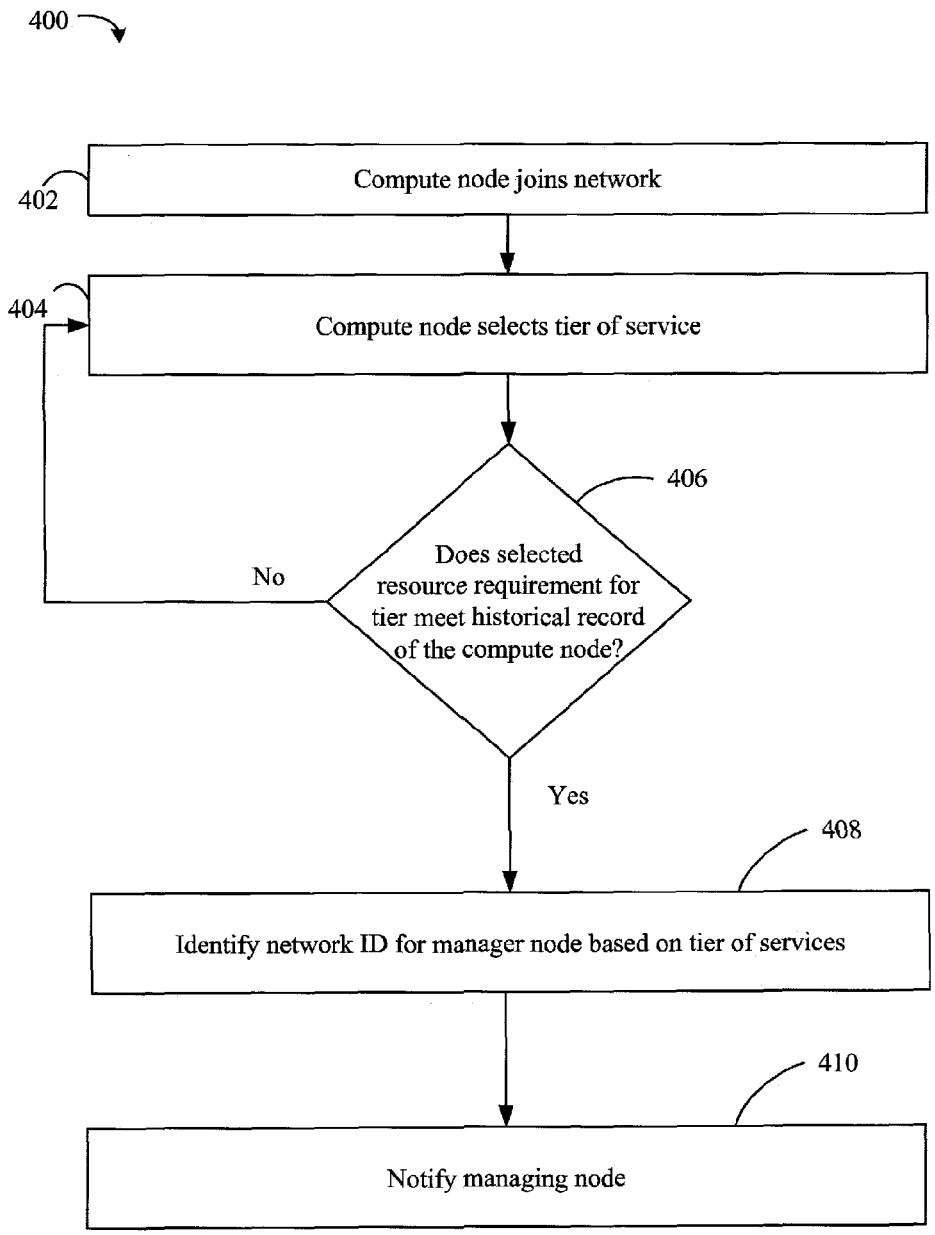
FIG. 4 is a flowchart of an example of a method to execute a node joining operation according to an embodiment.

FIG. 4 shows a method 400 that execute a node joining operation. The method 400 may generally be implemented by a computing device and operate in conjunction with any of the embodiments described herein, such as, for example architecture 100 (FIG. 1), architecture 200 (FIG. 2) and architecture 300 (FIG. 3) already discussed. In an embodiment, the method 400 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 400 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 402 joins a compute node to a network (e.g., a P2P network). Processing block 402 may include generating a P2P network identification (ID) being generated as follows: P2P network id=hash (Blockchain and/or DLP public address, IP address, country code). In some embodiments, processing block 402 determines a list of published nodes that help new nodes to join the network. Alternatively, or concurrently, an API may be provided that returns a list of nodes from a Blockchain that returns a random list of verified nodes that are already part of the P2P network.

In some embodiments, the data to generate the P2P network ID may be provided via a directory service that a network may provide to allow new users to join the P2P network. Alternatively, these data may be made distributed by having new users query a Blockchain directly to retrieve a list of users that are potential part of the P2P network.

In this particular example, the node that joins the network is a compute node. Thus, the compute node (e.g., a worker and/or utilitarian) selects the tier of service 404 that the compute node may provide. This may be based on processing power (e.g., a number of CPUs, types of CPUs, a number of GPUs, types of GPUs) and available storage (e.g., RAM, long-term storage such as solid-state drive and/or hard drives, etc.).

Illustrated processing block 406 determines whether the selected resource requirement for the tier meet the historical record for the compute node. For example, the compute node may need to have a CPU and/or GPU utilization of under 50% in the last 1 hour to be eligible to sell computing resources. That is, the historical resource usage (e.g., an available amount of resources) of the compute node should meet the minimum requirements (e.g., a minimum amount of resources that are to be sold) for the tier. Other thresholds may be adopted depending on the application, timing, etc.

There may further be different be different tier definitions for different classes of compute resources. If the resource requirements are not met, illustrated processing block 404 executes to select another tier of service.

If the resource requirements are met, illustrated processing block 408 generates a managing node network ID based on the tier of service. For example, the compute node may generate a managing node P2P network ID for the managing node of the tier of service that the compute node will provide. The managing node network ID may identify the marketplace owner for the tier. In some embodiments, in order to make sure that one single marketplace owner doesn't monopolize a given tier of service (thereby reducing the probability of malicious attacks and/or centralized control), a random number week number) may be added in the hash function as well. The P2P network ID of Marketplace owner may be identified as follows "hash(vCPUs, RAM, Week number)."

Illustrated processing block 410 notifies the managing node of addition of the compute node and any relevant features of the compute node (e.g., available resources, pricing requests, etc.). For example, the compute node may register itself with the managing node. The registration information may be in a form of a tuple (e.g., IP address, time interval of availability, resources available, etc.). The copy of this registration may also be stored in a Blockchain and/or DLT for auditing purposes.

Figure 5:
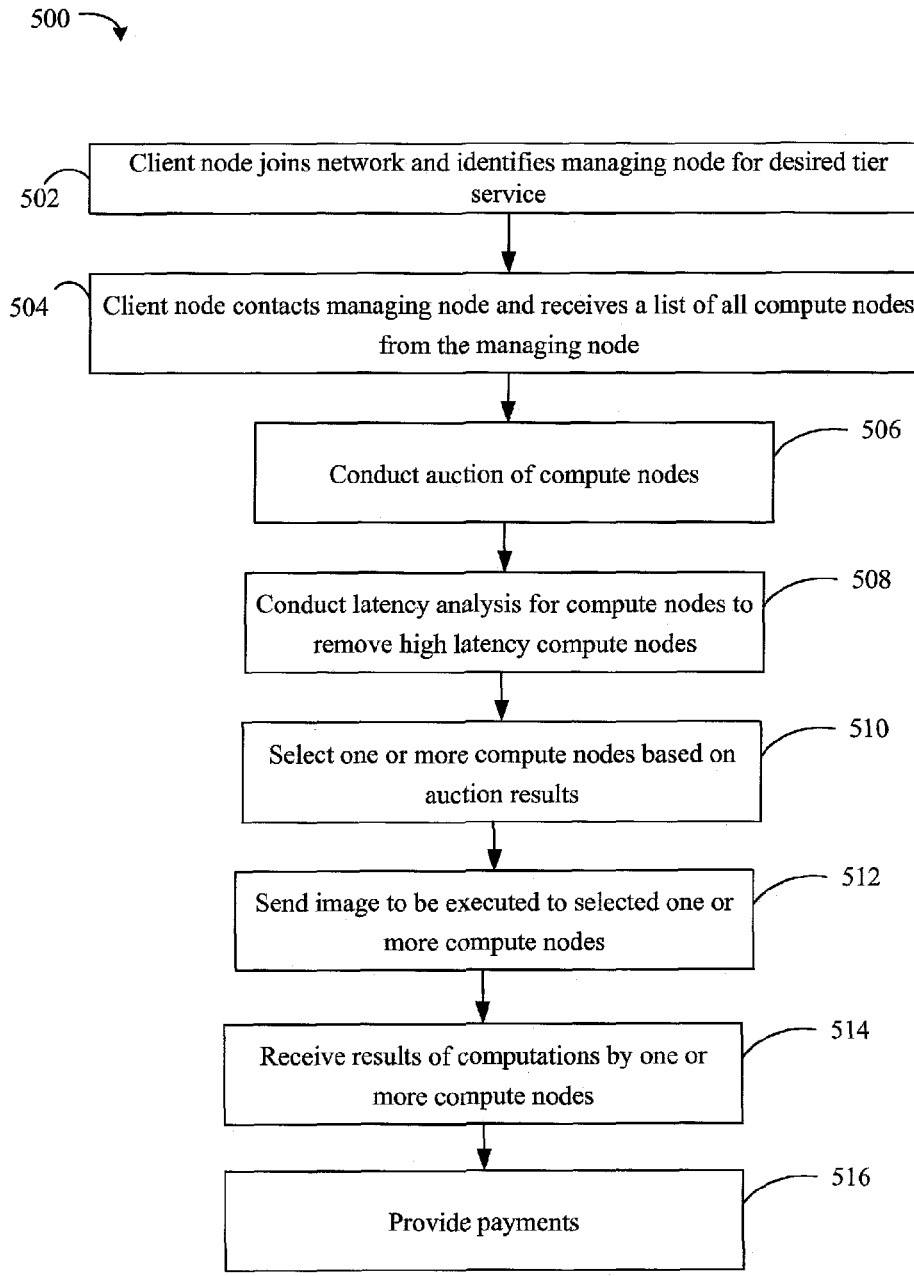
FIG. 5 is a flowchart of an example of a method to add a client node to network according to an embodiment.

FIG. 5 illustrates a method 500 to add a client node to network. The method 500 may generally be implemented in conjunction with any of the embodiments described herein, such as, for example for example architecture 100 (FIG. 1), architecture 200 (FIG. 2), the architecture 300 (FIG. 3) and the method 400 (FIG. 4) already discussed. More particularly, the method 500 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 502 joins a client node to a network and identifies a managing node for a desired tier service. For example, a user of a client node may specify the tier of the service they require for their task that is specified as a Docker image. Based on the tier selected, the client nodes may look up the corresponding marketplace owner (e.g., managing node). The lookup process may be similar or the same to the process described above with the compute node lookup described above in method 400.

In illustrated processing block 504, the client node may contact the managing node and receive a list of all compute nodes from the managing node. In illustrated processing block 506, the client node may then conduct an auction. During this auction the client node may contact all the compute nodes for pricing information. A granularity (e.g., fifteen minutes) may be used to receive replies that specify the price of execution (a time period that the auction is open). The replies may also serve as a verification that the compute nodes are still able to share their computing resources.

In illustrated processing block 508, the client node measures the latencies of all of the compute nodes that provided replies. All of the compute nodes that have a latency more than some specified threshold (e.g., default 5 seconds) may be rejected. In some embodiments, the latency is measured as a time it takes for a message from the compute node to the client node to reach the client node.

In illustrated processing block 510, upon receiving the pricing bids from the utilitarian nodes and/or the latency analysis, the client node may select one or more compute nodes from the compute nodes with the lowest bid that meets the latency, threshold. In some embodiments, the client node may select a more expensive compute node if the latency is below a speed threshold indicating that the client node is more desirable than cheaper compute nodes.

Illustrated processing block 512 sends an image to be executed to the selected one or more compute nodes. That is, the client node may communicate with the one or more compute nodes and send a Docker image to be executed. In illustrated processing block 514, the client node receives results of the computations by the one or more compute nodes. For example, the results of the computations from the one or more compute nodes are sent back to the client node and stored in a predetermined directory, or through a callback uniform resource indicator (URI).

Illustrated processing block 516 provides payments. In some embodiments, the price that is paid by the client node may be the second lowest price from all of the bids of the compute nodes as is described in a Vickrey auction. This form of auction mechanism may ensure that the best bidding strategy of a compute node is to truthfully share the cost of providing computing resources. Auction details may also be recorded in Blockchain. In some embodiments, the managing node may also be paid by the client node. The amount of payment to the managing node be the difference in amount between the lowest bid provided by the one or more compute nodes) and second lowest bid.

For example, in a Vickrey Auction, truth-telling is the best strategy for compute nodes to quote their cost for providing compute resources. The compute nodes may be selected based on the lowest cost but the compensation received by them is the second lowest cost listed in the same marketplace. Some embodiments may further extend the Vickrey auction protocol to take into account that multiple winners may be selected at the end of the auction because a file needs to be chunked and replicated, and hence needs to be stored on multiple miners. Further some embodiments may take into account multiple failure scenarios owing to the fact that all the participants in the auction are online and unknown to each other.

The method 500 may all be governed by a smart contract.

Figure 6:
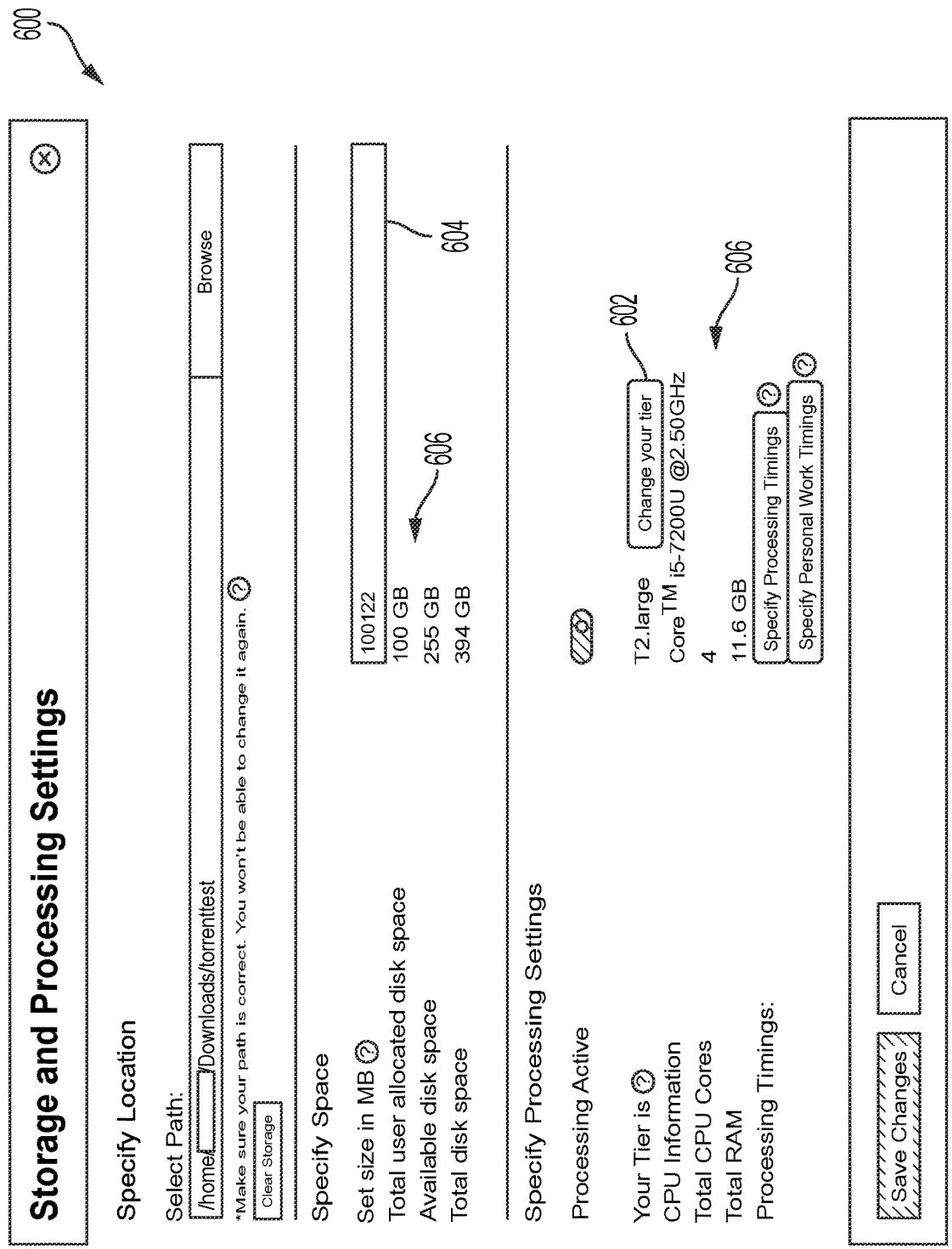
FIG. 6 is an example of a processing settings section according to an embodiment.

FIG. 6 illustrates the processing settings section 600 in an application (or other piece of software) that allows utilitarians to configure values for selling their resources. As shown, a user and/or compute node may set parameters 606. The parameters 606 may include a size of disk space 604 that is available for utilization by client nodes, and a tier setting 602 that the application may automatically define based on user input and configurations of the compute node.

Figure 7:
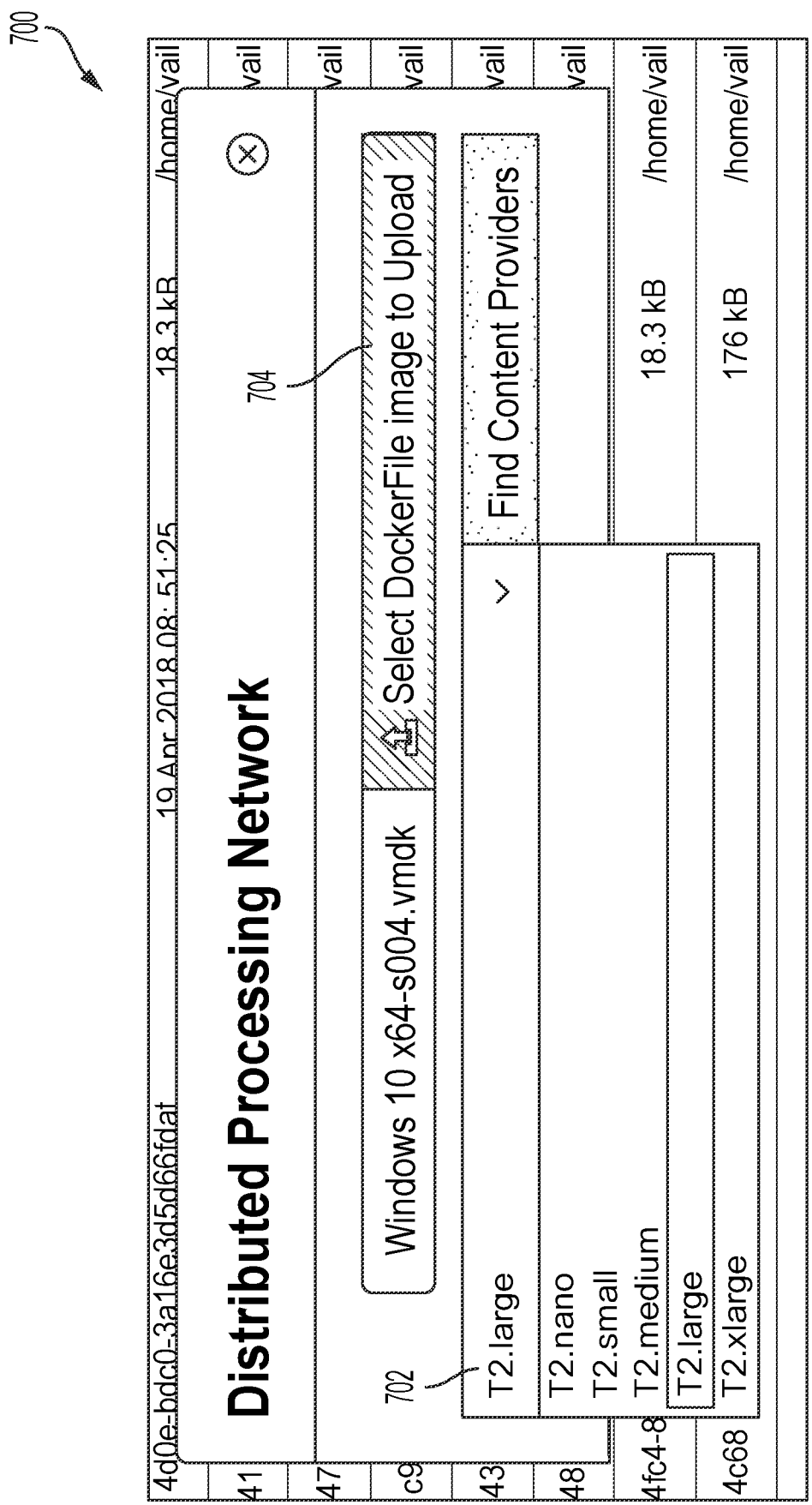
FIG. 7 is an example of a graphical user interface according to an embodiment.

FIG. 7 illustrates a graphical user interface 700 to allow a user and/or client node to buy compute resources from compute nodes in the network for distributed execution of tasks. The graphical user interface 700 shows how clients are able to configure requirements for the tier of compute capacity that is required for executing their tasks. For example, after the client node has specified task requirements 702 for the client node and specified the Docker image 704 to be executed, a software agent may reach out the managing node for the tier and obtain a list of available utilitarians (compute nodes). The user of the client node may be provided the details of the utilitarian along with the option for selecting one as shown in FIG. 8.

For example, the graphical user interface 800 lists utilitarian resources 802 provided to the marketplace. If a user does not select one of the utilitarian resources 802, then the agent may also be configured to automatically select a utilitarian resource from the utilitarian resources 804 with the lowest possible cost as long as the latency to the associated utilitarian from a latency test is under a predetermined amount.

In some embodiments, the client node may configure a directory where the test results are stored. Once the results from the computation are available, the user has the option to receive an email confirming the work is completed. Also, the application may provide a notification for the same actions.

Figure 9:
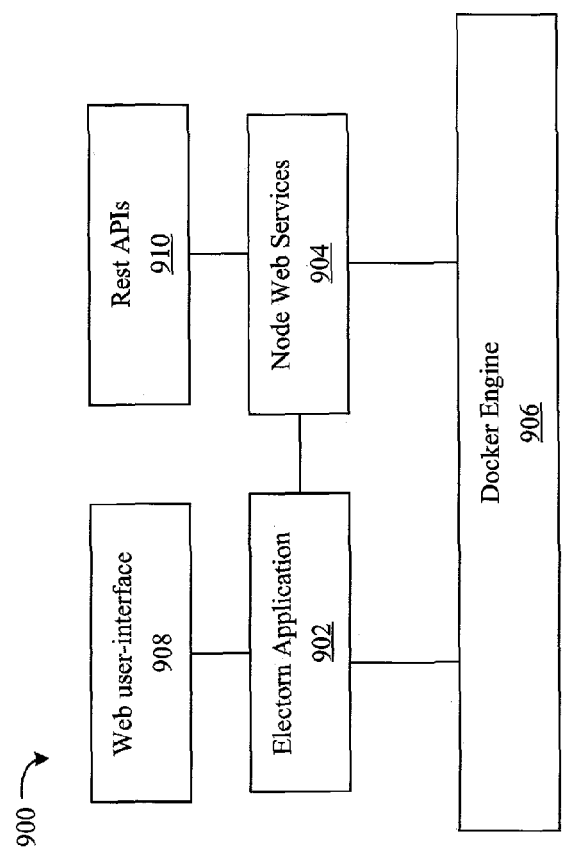
FIG. 9 is an example of a client configuration and open developer's interface according to an embodiment.

FIG. 9 illustrates a client configuration and open developer's interface 900 using rest APIs 910. A marketplace may be integrated into an application that also allow users to sell and buy storage capacity. The same capability may be provided through RESTful APIs 910 for selling, buying and managing compute resources. Such an open platform will allow developers to build new innovative apps to leverage massive, inexpensive and easy to access compute resources. As illustrated, the interface 900 may include electron applications 902, web-user interface 908, node web services 904 and docker engine 906.

Below is pseudo-code to implement the Rest APIs 910:

```
Create a compute resource to sell
POST /compute
{
    "tier_name": "string",
    "kademlia_id": "string",
    "public_address": "string",
    "ip_address": "string",
    "country_code": "string",
    "price_per_15_mins": "double",
    "availability_window": "string",
    "cpu_count": "int",
    "speed_in_ghz": "int",
    "memory_in_gb": "int"
}
Get a list of utilitarians providing a particular tier of
compute resource
GET /compute/{tier_name}
[
{ "kademlia_id": "string",
    "public_address": "string",
    "ip_address": "string",
    "country_code": "string",
    "latency_in_msecs": "int",
    "price_per_15_mins": "double",
    "cpu_count": "int",
    "speed_in_ghz": "int",
    "memory_in_gb": "int"},
{ },...
]
Submit a Docker instance for execution on the selected
utilitarian
POST /compute
{
    "client_kademlia_id": "string",
    "client_public_address": "string",
    "client_ip_address": "string",
    "docker_image": "blob",
    "return_uri": "string"
}
```

A task for a client that is packaged as a single docker container in the docker engine 906 may be managed. There are variety of workloads that require a set of interdependent tasks that may need to be executed sequentially with some intermediate parallel operations. A general workflow management system is provided, which clients may use to define and submit a workflow of tasks. In turn, the workflow management system may automatically schedule, manage and optimize the execution of all the tasks so as to provide best reliability, performance and cost benefits for completing all the necessary tasks.

Figure 10:
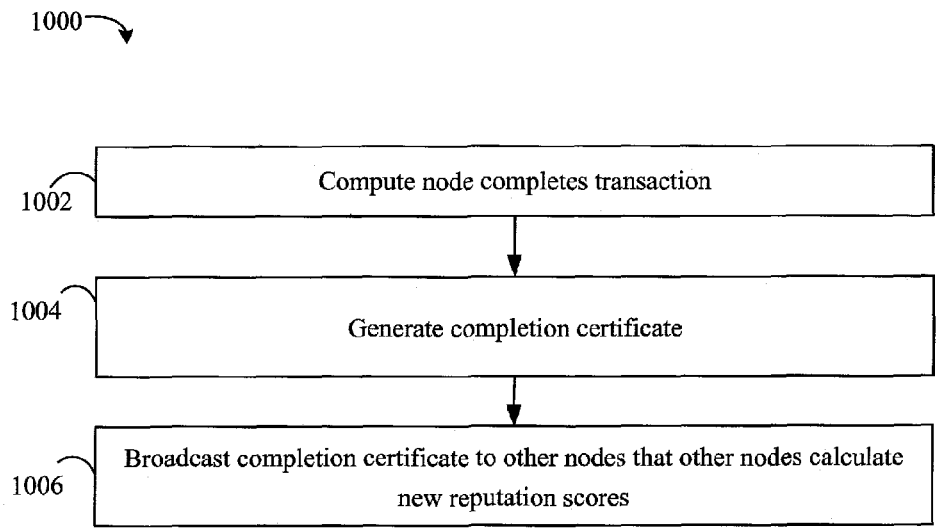
FIG. 10 is a flowchart of an example of a method to manage reputations according to an embodiment.

FIG. 10 illustrates a method 1000 to manage reputations. The method 1000' may generally be implemented in conjunction with any of the embodiments described herein, such as, for example for example architecture 100 (FIG. 1), architecture 200 (FIG. 2), the architecture 300 (FIG. 3), the method 400 (FIG. 4) and the method 500 (FIG. 5) already discussed. More particularly, the method 1000 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

According to some embodiments, innovative reputation management and incentive engineering is used to enable the system to be self-sustainable. Malicious or non-performing compute nodes, managing nodes and client nodes, as described in the previous section, may be removed from architectures based on low reputation scores.

Every node in the network may have a copy of every other node's reputation. The reputation may be an aggregate representation of the node's direct experience with working with the other nodes, and also the reputation broadcast messages that the node has received. This reputation may be calculated for every other node be it a utilitarian, marketplace owner and client.

According to an exemplary embodiment, reputation management may be performed as follows. In illustrated processing block 1002, a compute node may complete a transaction. In illustrated processing block 1004, after successfully completing the transaction, the compute node may generate a completion certificate. Illustrated processing block 1006 broadcasts the completion certificate to all other nodes that the compute node is aware of in the network. The completion certificate may contain a hash pointer to a blockchain block that records the payment transaction from the client node to the compute node. Other nodes after receiving the completion certificate calculates the reputation of the compute node as follows:

$$\text{utilitarian reputation new}=f(\text{utilitarian reputation old}*\text{client reputation}) \text{ or } 1 \text{ if either of the two values are } 0 \quad \text{Equation 1}$$

For the same pair of compute and client nodes increases the reputation at most once in a week.

The reputation may be associated with the P2P network id of a node, which in turn means that it's associated with the blockchain public address. Further, the reputation may be a monotonically increasing integer. The higher the value means higher the reputation with zero being the worst. The value of zero also means that a node's reputation is unknown. A worst reputation and unknown may be treated interchangeably since a malicious node can always regenerate its P2P network id and re-join the network as an unknown node.

Figure 11:
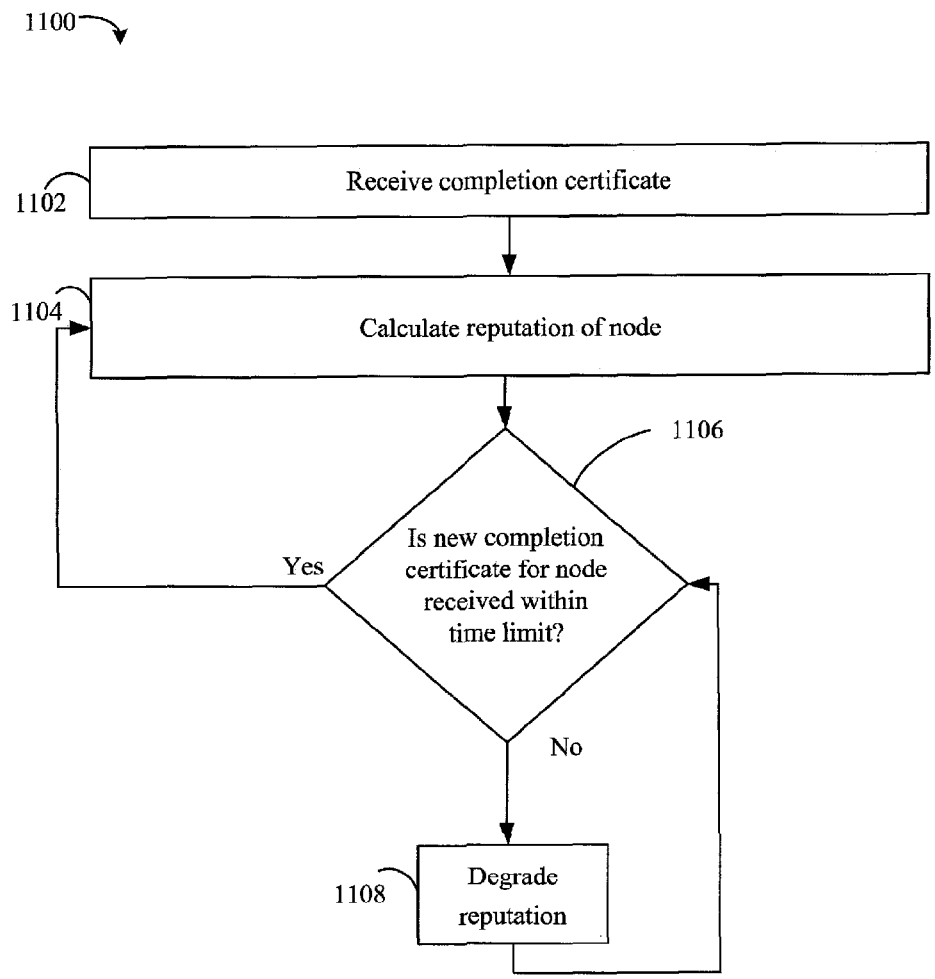
FIG. 11 is a flowchart of an example of a method of updating reputations according to an embodiment.

FIG. 11 illustrates a method of updating reputations. Illustrated processing block 1102 receives a completion certificate. Illustrated processing block 1104 calculates the reputation score of a node associated with the completion certificate. Illustrated processing block 1106 determines if a new completion certificate for a node is received within a time limit. For example, the reputation of a node may be a decaying function of time. So if a utilitarian does not provide service it gradually degrades over time. If a new certificate is not received, illustrated processing block 1108 may degrade the reputation as follows:

$$\text{New Reputation}=\text{Ratings in last 30 days}*\alpha+\text{Previous ratings}*(1-\alpha), \quad \text{Equation 2}$$

In the above equation, $\alpha$ controls the weightage assigned to newer ratings. As described, the reputation of nodes may be a part of the determination of when nodes decide to offer and/or receive services.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method comprising:
   generating, with each of a plurality of managing nodes, a list of a plurality of compute nodes that are within a tier of a plurality of tiers;
   providing, with a first compute node, compute resources for other nodes to utilize;
   conducting, with the first compute node, a determination that the first compute node is within a first tier of the tiers based at least in part on the compute resources;
   sending, with the first compute node, a notification to at least one of the managing nodes to add the first compute node to at least one first list of the lists generated by the at least one of the managing nodes based on the determination;
   conducting, with a client node, an identification of the first tier based on a predicted compute capacity that is to be utilized to execute one or more tasks associated with the client node;
   identifying, with the client node, the at least one of the managing nodes based on the identified first tier;
   requesting, with the client node, the at least one first list from the at least one of the managing nodes; and
   selecting, with the client node, the first compute node listed in the at least one first list based on the predicted compute capacity to execute the one or more tasks.

2. The method of claim 1, further comprising transmitting, with the at least one of the managing nodes, the at least one first list to the client node.

3. The method of claim 1, further comprising:
   identifying, with the client node, a lowest cost node from the plurality of compute nodes listed in the at least one first list; and
   executing, with the client node, a latency test to determine a latency between the client node and the lowest cost node.

4. The method of claim 3, further comprising:
   determining, with the client node, that the latency is greater than a threshold value; and
   in response to the latency being above the threshold value, determining, with the client node, that the one or more tasks are to be offloaded to the first compute node for execution.

5. The method of claim 1, further comprising:
   at least one of determining, with the first compute node, a cost to utilize the compute resources based at least on a cost for electricity and user input or transmitting, with the first compute node, an identification of the compute resources to the managing node.

6. At least one non-transitory computer readable storage medium comprising a set of instructions, which when executed by a plurality of computing devices, cause the plurality of computing devices to:
   generate, with each of a plurality of a managing nodes, a list of a plurality of compute nodes that are within a tier of a plurality of tiers;
   provide, with a first compute node, compute resources for other nodes to utilize;
   conduct, with the first compute node, a determination that the first compute node is within a first tier of the tiers based at least in part on the compute resources;
   send, with the first compute node, a notification to at least one of the managing nodes to add the first compute node to at least one first list of the lists that is generated by the at least one of the managing nodes based on the determination;
   conduct, with a client node, an identification of the first tier based on a predicted compute capacity that is to be utilized to execute one or more tasks associated with the client node;
   identify, with the client node, the at least one of the managing nodes based on the identified first tier;
   request, with the client node, the at least one first list from the at least one of the managing nodes; and
   select, with the client node, the first compute node listed in the at least one first list based on the predicted compute capacity to execute the one or more tasks.

7. The at least one non-transitory computer readable storage medium of claim 6, wherein the compute resources include one or more available central processing units and an available memory.

8. The at least one non-transitory computer readable storage medium of claim 6, wherein the instructions, when executed, cause the plurality of computing devices to transmit, with the at least one of the managing nodes, the at least one first list to the client node.

9. The at least one non-transitory computer readable storage medium of claim 6, wherein the instructions, when executed, cause the plurality of computing devices to identify, with the client node, a lowest cost node from the plurality of compute nodes listed in the at least one first list.

10. The at least one non-transitory computer readable storage medium of claim 9, wherein the instructions, when executed, cause the plurality of computing devices to execute, with the client node, a latency test to determine a latency between the client node and the lowest cost node.

11. The at least one non-transitory computer readable storage medium of claim 10, wherein the instructions, when executed, cause the plurality of computing devices to:
    determine, with the client node, that the latency is greater than a threshold value;
    in response to the latency being above the threshold value, determine, with the client node, that the one or more tasks are to be offloaded to the first compute node for execution; and
    determine, with the first compute node, a cost to utilize the compute resources based at least on a cost for electricity and user input, or transmit, with the first compute node, an identification of the compute resources to the at least one of the managing nodes.

12. A peer-to-peer network comprising:
    a plurality of managing nodes each generating a list of a plurality of compute nodes that are within a tier of a plurality of tiers;
    a first compute node providing compute resources for other nodes to utilize, the first compute node further conducting a determination that the first compute node is within a first tier of the tiers based at least in part on the compute resources, and sending a notification to at least one of the managing nodes to add the first compute node to at least one first list of the lists that is generated by the at least one of the managing nodes based on the determination; and
    a client node conducting an identification of the first tier based on a predicted compute capacity that is to be utilized to execute one or more tasks associated with the client node, identifying the at least one of the managing nodes based on the identified first tier, requesting the at least one first list from the at least one of the managing nodes and selecting the first compute node listed in the at least one first list based on the predicted compute capacity to execute the one or more tasks.

13. The network of claim 12, wherein the compute resources include one or more available central processing units and an available memory.

14. The network of claim 12, wherein the at least one of the managing nodes transmits the at least one first list to the client node.

15. The network of claim 12, wherein the client node identifies a lowest cost node from the plurality of compute nodes listed in the at least one first list.

16. The network of claim 15, wherein the client node executes a latency test to determine a latency between the client node and the lowest cost node.

17. The network of claim 16, wherein the client node:
   determines that the latency is greater than a threshold value; and
   in response to the latency being above the threshold value, determines that the one or more tasks are to be offloaded to the first compute node for execution.

18. The network of claim 12, wherein the first compute node determines a cost to utilize the compute resources based at least on a cost for electricity and user input.

19. The network of claim 12, wherein the first compute node transmits an identification of the compute resources to the at least one of the managing nodes.

* * * * *